(12) United States Patent
Schmidt

(10) Patent No.: US 9,917,665 B1
(45) Date of Patent: Mar. 13, 2018

(54) TESTING DEVICE AND TESTING METHOD WITH NOISE LEVEL ADJUSTMENT

(71) Applicant: Rohde & Schwarz GmbH & Co. KG, Munich (DE)

(72) Inventor: Stefan Schmidt, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/181,388

(22) Filed: Jun. 13, 2016

(51) Int. Cl.
*H04B 17/309* (2015.01)

(52) U.S. Cl.
CPC .................. *H04B 17/309* (2015.01)

(58) Field of Classification Search
CPC .................................................. H04B 17/309
See application file for complete search history.

(56) References Cited

U.S. PATENT DOCUMENTS

| | | | | |
|---|---|---|---|---|
| 2005/0267715 A1* | 12/2005 | Kolu | .................. | H04B 17/3912 702/189 |
| 2007/0019769 A1* | 1/2007 | Green | .................. | H04W 24/00 375/360 |
| 2011/0053516 A1* | 3/2011 | Harteneck | ............... | H04L 1/243 455/67.11 |
| 2012/0243419 A1* | 9/2012 | Lee | ........................ | H04W 24/06 370/241 |
| 2012/0244818 A1* | 9/2012 | Kyosti | ............... | G01R 29/0814 455/67.13 |
| 2013/0029608 A1* | 1/2013 | Kuo | ....................... | H04W 24/00 455/67.11 |
| 2014/0154995 A1* | 6/2014 | Kennedy | ............... | H04W 24/06 455/67.11 |
| 2014/0266929 A1* | 9/2014 | Huynh | ................... | G01R 29/10 343/703 |
| 2015/0017928 A1* | 1/2015 | Griesing | ............ | H04B 17/0085 455/67.14 |
| 2016/0285572 A1* | 9/2016 | Manghal | ............ | H04B 17/0087 |

FOREIGN PATENT DOCUMENTS

WO    WO2011051537 A1    5/2011

* cited by examiner

*Primary Examiner* — David Bilodeau
(74) *Attorney, Agent, or Firm* — Potomac Technology Law, LLC

(57) ABSTRACT

A testing device is provided. The testing device comprises a signal generating unit configured to generate a first number of signals based on a number of receiving components of a device under test, and at least one noise generating unit, each configured to generate noise and to apply the noise to the first number of signals, such that one of a preset total noise power and a preset signal-to-noise ratio is achieved at a reference point associated with the device under test. The testing device is configured to output a second number of signals to the device under test, wherein the second number of signals corresponds to one of the first number of signals and the first number of signals with the applied noise.

11 Claims, 5 Drawing Sheets

TESTING DEVICE AND TESTING METHOD WITH NOISE LEVEL ADJUSTMENT

FIELD

The present invention relates to a testing device and a testing method, such as with noise level adjustment, for testing a device under test with respect to wireless communication.

BACKGROUND

Generally, in times of an increasing number of wireless communication applications employing Multiple Input Multiple Output (MIMO) systems, such as Long Term Evolution (LTE), there is a growing need of a testing device and a testing method for testing devices under test applying such systems that employ multiple antennas.

The publication WO2011051537A1 discloses a testing system comprising a noise source coupled to at least two antenna elements. For testing a device under test, the noise source wirelessly transmits noise at a total noise power from the at least two antenna elements to the device under test. In any case, however, this total noise power is disadvantageously applied to the same reference point within the signal path between transmitter and receiver. Consequently, it is impossible to react to different devices under test, respectively to various use cases, in a flexible and cost-effective manner.

Accordingly, there is a need for an approach for testing devices under test having multiple inputs and multiple outputs, and for allowing for the usage of arbitrarily chosen reference points within the corresponding signal path in order to ensure flexible and effective measurements.

SUMMARY

Embodiments of the present invention advantageously address the foregoing requirements and needs, as well as others, by providing approaches for a testing device and testing method for the testing of a device under test (having multiple inputs and multiple outputs), which facilitates the usage of arbitrarily chosen reference points within the corresponding signal path in order to ensure flexible and effective measurements.

In accordance with example embodiments, a testing device for testing a device under test is provided. The testing device comprises a signal generating unit and at least one noise generating unit. The signal generating unit is configured to generate a first number of signals according to a number of receiving means of the device under test. Further, each of the at least one noise generating unit is configured to generate noise and to apply the noise to the first number of signals, such that a preset total noise power or a preset signal-to-noise ratio is achieved at a reference point within or at the device under test or at a signal path between the testing device and the device under test. Additionally, the testing device is configured to output a second number of signals corresponding to the first number of signals or corresponding to the first number of signals applied with noise to the device under test.

By way of example, the preset total noise at the reference point is equal to the sum of various other noise sources along the corresponding signal path and the noise generated and applied by the at least one noise generating unit.

By way of further example, the testing device further comprises a reference measurement unit which is configured to measure the total noise power or the signal-to-noise ratio or the power of the various other noise sources at the reference point.

By way of further example, the device under test is configured by the testing device to measure the total noise power or the signal-to-noise ratio or the power of the various other noise sources at the reference point.

By way of further example, the measured total noise power or the signal-to-noise ratio or the power of the various other noise sources at the reference point are fed back to the testing device.

By way of further example, the testing device further comprises a fading unit which is configured to emulate a transmission channel and to process the first number of signals in a manner that the first number of signals is additionally faded in consideration of the emulated transmission channel.

By way of further example, the emulated transmission channel is time-invariant or time-variant.

In accordance with further example embodiments, a method for testing a device under test is provided. The method comprises generating a first number of signals according to a number of receiving means of the device under test. The method further comprises generating noise and applying the noise to the first number of signals, such that a preset total noise power or a preset signal-to-noise ratio is achieved at a reference point within or at the device under test or at a signal path leading to the device under test. The method further comprises outputting a second number of signals corresponding to the first number of signals or corresponding to the first number of signals applied with noise to the device under test.

By way of example, the preset total noise at the reference point is equal to the sum of various other noise sources along the corresponding signal path and the noise generated and applied.

By way of further example, the total noise power or the signal-to-noise ratio or the power of the various other noise sources at the reference point are measured.

By way of further example, the measured total noise power or the signal-to-noise ratio or the power of the various other noise sources at the reference point are fed back to the testing device.

By way of further example, a transmission channel is emulated and the first number of signals is processed in a manner that the first number of signals is additionally faded in consideration of the emulated transmission channel.

By way of further example, the emulated transmission channel is time-invariant or time-variant.

In accordance with further example embodiments, a computer-readable storage medium is provided. The computer-readable storage medium includes one or more sequences of one or more instructions, the one or more sequences of one or more instructions including instructions which, when executed by one or more processors, cause the one or more processors to perform the steps of generating a first number of signals according to a number of receiving means of the device under test, generating noise and applying the noise to the first number of signals, such that a preset total noise power or a preset signal-to-noise ratio is achieved at a reference point within or at the device under test or at a signal path leading to the device under test, and outputting a second number of signals corresponding to the first number of signals or corresponding to the first number of signals applied with noise to the device under test.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Approaches for a testing device and testing method for the testing of a device under test (having multiple inputs and multiple outputs), which facilitates the usage of arbitrarily chosen reference points within the corresponding signal path in order to ensure flexible and effective measurements, are described.

Generally, for the following description, t denotes the time in seconds and the indices i and k run in the range $1 \leq i \leq Nrx$ and $0 \leq k \leq L$, respectively, where Nrx corresponds to the number of receive means of a device under test and L corresponds to a number of circuit components. The circuit components are connected in series between a reference point A on signal path i in a testing device (according to example embodiments of the present invention) and a reference point B on that signal path in the device under test, or between the testing device and the device under test.

Additionally, in this general context, the L components can be regarded to be part of either the testing device or the device under test. Further, circuit components between the testing device and the device under test (e.g. cables, couplers, etc.) can be associated arbitrarily to the testing device or to the device under test. In this context, such circuit components, (respectively a portion of or even the whole corresponding signal path) may be part of a simulation model implemented in the testing device, in the device under test, in an external device, or in any combination thereof.

Figure 1:
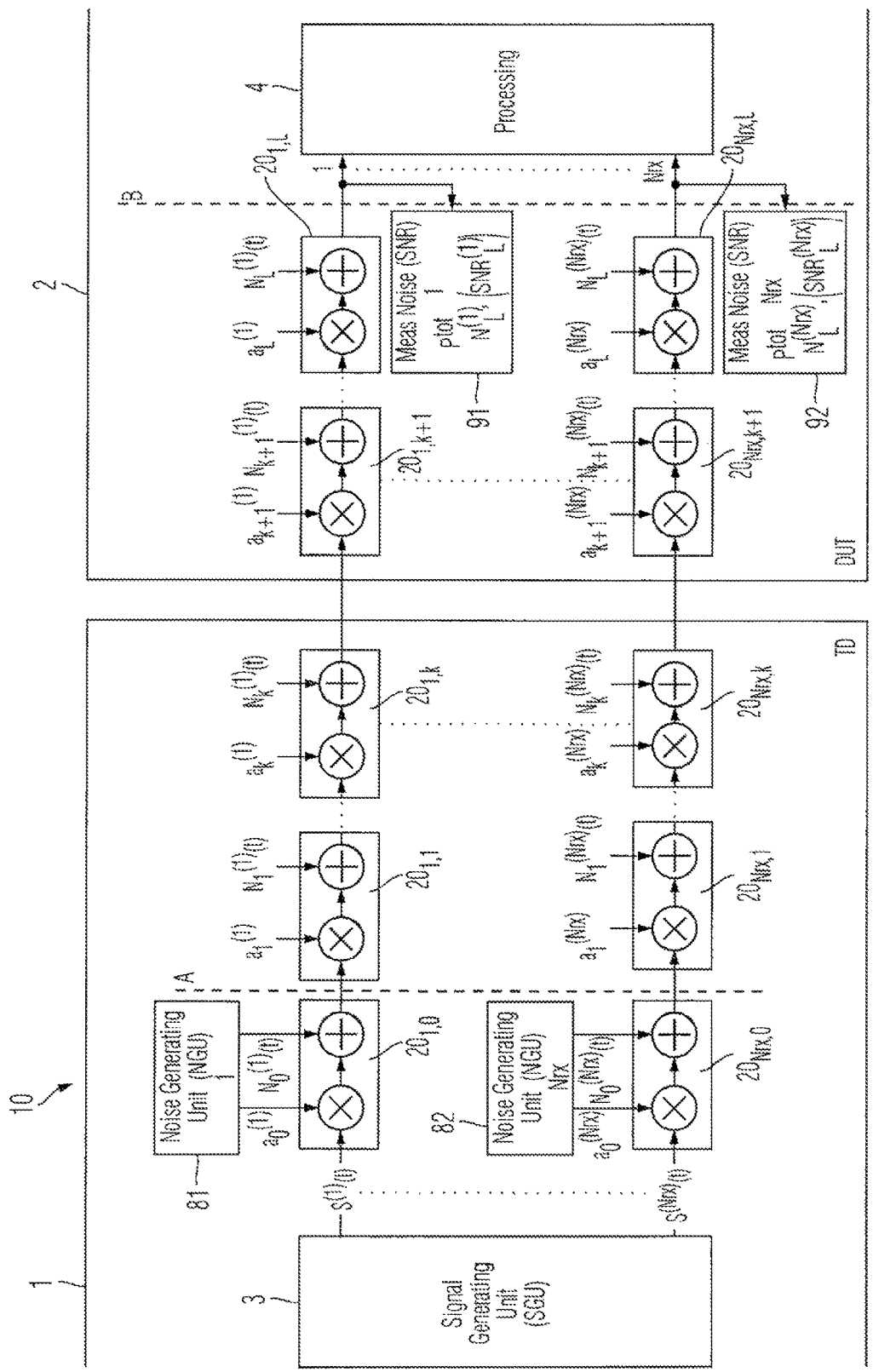
FIG. 1 shows a block diagram of a first measurement system including a testing device, in accordance with example embodiments.
Figure 2:
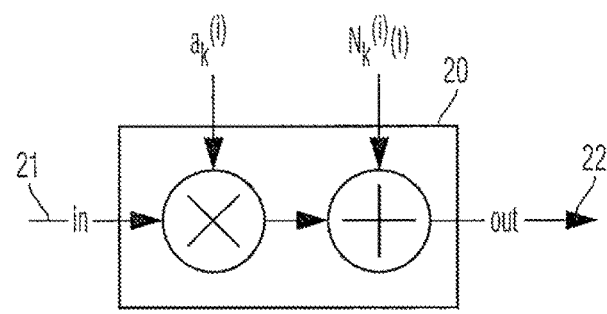
FIG. 2 shows a block diagram of a circuit component of FIG. 1, in accordance with example embodiments.

FIG. 1 shows a block diagram of a first measurement system 10 including a testing device 1, in accordance with example embodiments of the present invention. Further, FIG. 2 shows a block diagram of a circuit component 20 of FIG. 1, in accordance with example embodiments of the present invention. With reference to FIG. 2, circuit components 20, as generally referenced above, are typically characterized through a signal input 21 and a signal output 22. A circuit component 20 may amplify or attenuate the signal at its input by a factor $a_k^{(i)}$ and may corrupt the scaled input signal with an additive noise signal $N_k^{(i)}(t)$.

With reference to FIG. 1, the testing device 1 comprises a signal generating unit 3 and Nrx noise generating units which are represented by the first noise generating unit 81 and the Nrx-th noise generating unit 82.

The signal generating unit is connected to the input of each of Nrx first circuit components $20_{1,0}$ to $20_{Nrx,0}$, which amplify or attenuate the input signal from the signal generating unit by a corresponding factor $a_0^{(1)}$ to $a_0^{(Nrx)}$ and corrupt this scaled input signal with a corresponding additive noise signal $N_0^{(1)}(t)$ to $N_0^{(Nrx)}(t)$, where both the corresponding factor and the corresponding additive noise signal are set by the respective noise generating unit, which is illustrated by the first noise generating unit 81 and the Nrx-th noise generating unit 82.

By way of example, each of the Nrx first circuit components $20_{1,0}$ to $20_{Nrx,0}$ is connected to k further circuit components $20_{1,1}$ to $20_{1,k}$, respectively $20_{Nrx,1}$ to $20_{Nrx,k}$, in series, each of which amplifies or attenuates the input signal from the previous circuit component by a ((Nrx) (corresponding factor $a_1^{(1)}$ to $a_k^{(1)}$, respectively $a_1^{(Nrx)}$ to $a_k^{(Nrx)}$, and corrupts this scaled input signal with a corresponding additive noise signal $N_1^{(1)}(t)$ to $N_k^{(1)}(t)$, respectively $N_1^{(Nrx)}(t)$ to $N_k^{(Nrx)}(t)$ Due to the fact that the k further circuit components $20_{1,1}$ to $20_{1,k}$, respectively $20_{Nrx,1}$ to $20_{Nrx,k}$, are part of the testing device 1, various other noise sources within the testing device 1 itself are taken into consideration with the aid of the corresponding factors $a_1^{(1)}$ to $a_k^{(1)}$, respectively $a_1^{(Nrx)}$ to $a_k^{(Nrx)}$, and the corresponding additive noise signals $N_1^{(1)}(t)$ to $N_k^{(1)}(t)$, respectively $N_1^{(Nrx)}(t)$ to $N_k^{(Nrx)}(t)$.

By way of further example, in an analogous manner, the output of each series connection of the k further circuit components $20_{1,1}$ to $20_{1,k}$, respectively $20_{Nrx,1}$ to $20_{Nrx,k}$, is connected to L−k+2 further circuit components $20_{1,k+1}$ to $20_{1,L}$, respectively $20_{Nrx,k+1}$ to $20_{Nrx,L}$, each of which amplifies or attenuates the input signal from the previous circuit component by a corresponding factor $a_{k+1}^{(1)}$ to $a_L^{(1)}$, respectively $a_{k+1}^{(Nrx)}$ to $a_L^{(Nrx)}$, and corrupts this scaled input signal with a corresponding additive noise signal $N_{k+1}^{(1)}$ to $N_L^{(1)}(t)$, respectively $N_{k+1}^{(Nrx)}(t)$ to $N_L^{(Nrx)}(t)$. Due to the fact that the L−k+2 further circuit components $20_{1,1}$ to $20_{1,L}$, respectively $20_{Nrx,k+1}$ to $20_{Nrx,L}$, are part of the device under test 2, various other noise sources within the device under test 2 itself are taken into consideration with the aid of the corresponding factors $a_{k+1}^{(1)}$ to $a_L^{(1)}$, respectively $a_{k+1}^{(Nrx)}$ to $a_L^{(Nrx)}$, and the corresponding additive noise signals $N_{k+1}^{(1)}(t)$ to $N_L^{(1)}(t)$, respectively $N_{k+1}^{(Nrx)}(t)$ to $N_L^{(Nrx)}(t)$.

Further, the output of each of the last circuit components $20_{1,L}$ to $20_{Nrx,L}$, in other words, the L-th circuit component of each of the Nrx signal paths, each of which comprises L circuit components connected in series, is connected to a processing unit 4 of the device under test 2, which processes the received data.

In general, considering that i runs in range from 1 to Nrx, the signal generating unit 3 outputs Nrx signals $S^{(i)}(t)$ and the Nrx noise generating units output scaling factors $a_0^{(i)}$ and noise signals $N_0^{(i)}(t)$. The signals $S^{(i)}(t)$ are scaled with $a_0^{(i)}$ and the noise signals $N_0^{(i)}(t)$ are applied additively to the signals $S^{(i)}(t)*a_0^{(i)}$. The resulting signals $S^{(i)}(t)*a_0^{(i)}+N_0^{(i)}(t)$ are then applied to a series of circuit components according to FIG. 2 as described above.

Further, according to FIG. 1, in the device under test 2, the Nrx total noise powers $P_{N_L^{(i)}}^{tot}$ (or equivalently signal-to-noise ratios $SNR_L^{(i)}$) at the outputs of the circuit components L ($20_{1,L}$ to $20_{Nrx,L}$) are measured. In this case, therefore, a noise measurement is performed at reference point B with the aid of Nrx reference measurement units which are represented by the first reference measurement unit 91 and the Nrx-th reference measurement unit 92. In the measurement system of FIG. 1, the reference point B is chosen to be located at the processing unit 4 of the device under test 2, and the reference point A is chosen to be located between the first and the second circuit component within the testing device 1.

Figure 3:
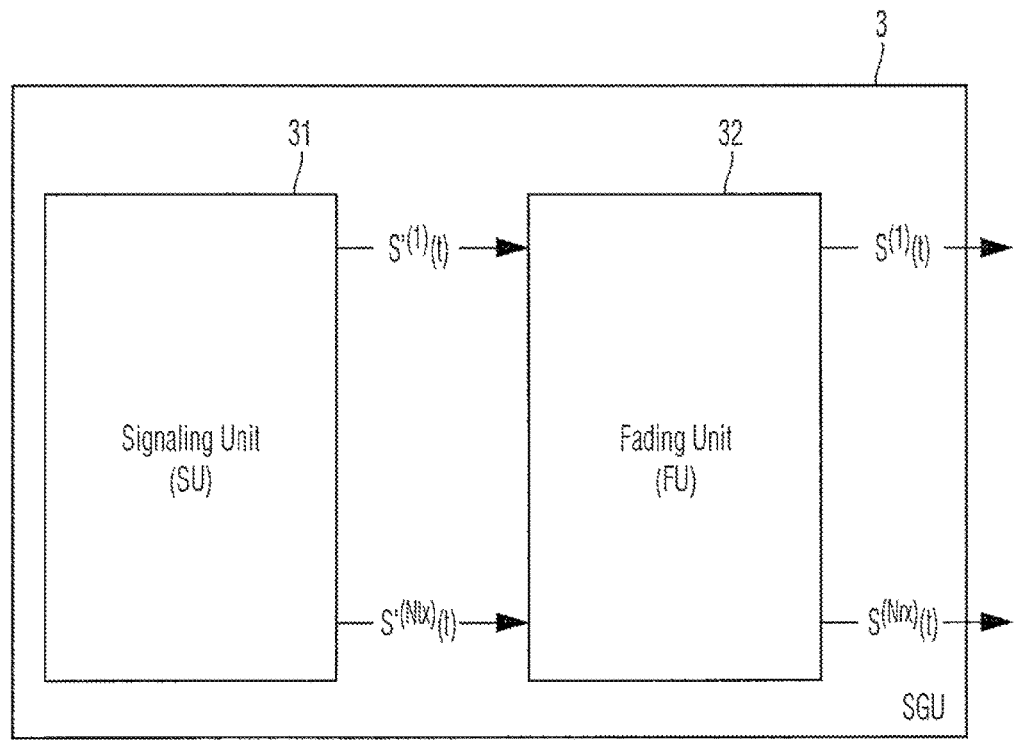
FIG. 3 shows a block diagram of a signal generating unit of FIG. 1, in accordance with example embodiments.

In general and with respect to FIG. 3, the signal generating unit 3 may be—but is not necessarily—composed of a signaling unit 31 and a fading unit 32.

By way of further example, the signaling unit 31 outputs Ntx signals which are connected with the Ntx inputs of the fading unit 32, whereby Ntx may correspond to a number of transmit means of a emulated transmitter such as the number of antennas of a base station. Further, the fading unit 32 emulates a transmission channel between a transmitter and a receiver. This emulated transmission channel may be time-invariant or time-variant. Then, the fading unit 32 outputs Nrx faded signals, where Nrx still denotes the number of receive means of the device under test 2.

At this point and with respect to all drawings, the following general principles are described.

Considering that i and k run in range: (1) the signal powers at the outputs of the signal generating unit are denoted $P_{S^{(i)}}$; (2) the signal powers at the output of circuit components k is denoted $$P_{S_k^{(i)}};$$

(3) the noise powers injected at circuit components k are denoted $$P_{N_k^{(i)}};$$

(4) the total noise powers at the output of circuit components k are denoted $$P_{N_k^{(i)}}^{tot};$$

and (5) the signal-to-noise ratios at the output of circuit components k are denoted $SNR_k^{(i)}$.

Based on the foregoing definitions, certain associated formulations may be expressed as follows:

$$P_{S_k^{(i)}} = P_{S^{(i)}} * \prod_{l=0}^{k} a_l^{(i)},$$

$$P_{N_k^{(i)}}^{tot} = \sum_{l=0}^{k}\left[\prod_{r=l+1}^{k} a_r^{(i)}\right] P_{N_l^{(i)}}, \text{ and}$$

$$SNR_k^{(i)} = \frac{P_{S_k^{(i)}}}{P_{N_k^{(i)}}^{tot}} = \frac{P_{S^{(i)}} * \prod_{l=0}^{k} a_l^{(i)}}{\sum_{l=0}^{k}\left[\prod_{r=l+1}^{k} a_r^{(i)}\right] P_{N_l^{(i)}}}.$$

As a result, at the output of components L, the following formulation applies:

$$SNR_L^{(i)} = \frac{P_{S_L^{(i)}}}{P_{N_L^{(i)}}^{tot}} = \frac{P_{S^{(i)}} * \prod_{l=0}^{L} a_l^{(i)}}{\sum_{l=0}^{L}\left[\prod_{r=l+r}^{L} a_r^{(i)}\right] P_{N_l^{(i)}}}.$$

Equivalently:

$$\frac{1}{SNR_L^{(i)}} = \frac{\sum_{l=0}^{L}\left[\prod_{r=l+r}^{L} a_r^{(i)}\right] P_{N_l^{(i)}}}{P_{S^{(i)}} * \prod_{l=0}^{L} a_l^{(i)}} = \frac{\left[\prod_{r=1}^{L} a_r^{(i)}\right] P_{N_0^{(i)}} + \sum_{l=1}^{L}\left[\prod_{r=l+r}^{L} a_r^{(i)}\right] P_{N_l^{(i)}}}{P_{S^{(i)}} * \prod_{l=0}^{L} a_l^{(i)}} =$$

$$\frac{P_{N_0^{(i)}}}{P_{S^{(i)}} * a_0^{(i)}} + \frac{\sum_{l=1}^{L}\left[\prod_{r=l+1}^{L} a_r^{(i)}\right] P_{N_l^{(i)}}}{P_{S_L^{(i)}}} = \frac{1}{SNR_0^{(i)}} + \frac{1}{SNR_L^{(i)}|_{P_{N_0^{(i)}}=0}}$$

It then follows that:

$$SNR_0^{(i)} = \frac{1}{\frac{1}{SNR_L^{(i)}} - \frac{1}{SNR_L^{(i)}|_{P_{N_0^{(i)}}=0}}} = \frac{SNR_L^{(i)}|_{P_{N_0^{(i)}}=0} * SNR_L^{(i)}}{SNR_L^{(i)}|_{P_{N_0^{(i)}}=0} - SNR_L^{(i)}}.$$

Thus, if one wants to measure $SNR_{User}^{(i)}$ (i.e., $SNR_L^{(i)} = SNR_{User}^{(i)}$ or respectively $$P_{N_L^{(i)}}^{tot} = P_{N_{User}^{(i)}}^{tot})$$

at the output of circuit components L, the Nrx noise generating units should be configured (the illustrated noise generating units 81, 82 being two examples thereof, in the testing device 1) with $SNR_0^{(i)}$ according to:

$$SNR_0^{(i)} = \frac{SNR_L^{(i)}|_{P_{N_0^{(i)}}=0} * SNR_{User}^{(i)}}{SNR_L^{(i)}|_{P_{N_0^{(i)}}=0} - SNR_{User}^{(i)}}$$

where $$SNR_L^{(i)}|_{P_{N_0^{(i)}}=0}$$

is obtained through a reference measurement of $SNR_L^{(i)}$ with $$N_0^{(i)}(t) = 0$$

$$\left(\Leftrightarrow P_{N_0^{(i)}} = 0\right),$$

which is illustrated by the two representative reference measurement units 91, 92 of the Nrx reference measurement units.

Additionally, as long as the signal power at the output of circuit components $$L\left(=P_{S_L^{(i)}}\right)$$

is the same for both reference and actual measurement, the value of $$SNR_L^{(i)}|_{P_{N_0^{(i)}}=0}$$

is independent of $a_0^{(i)}$. Consequently, $a_0^{(i)}$ is allowed to take on different values in the actual and the reference measurement.

Figure 4:
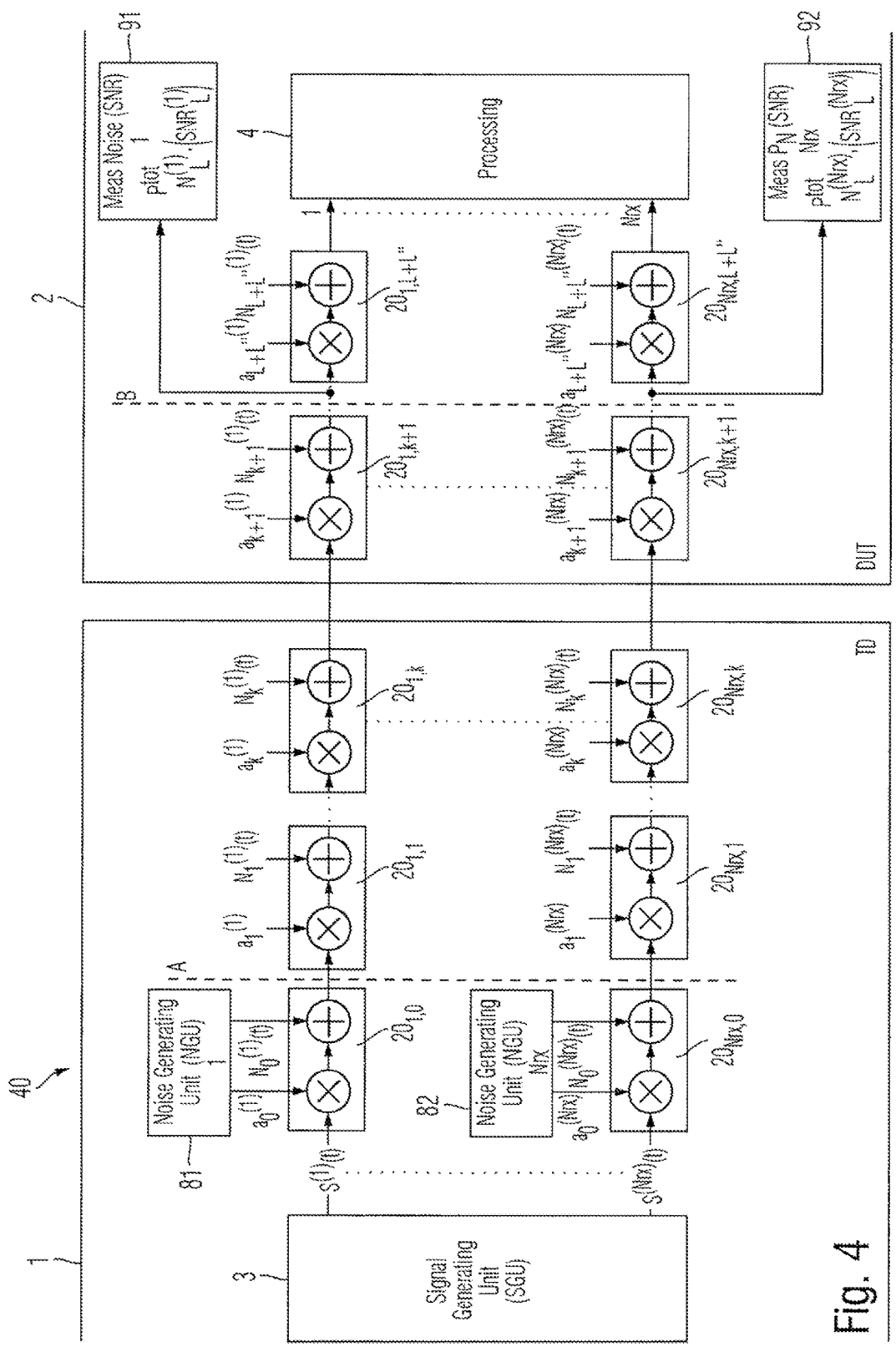
FIG. 4 shows a block diagram of a second measurement system including a testing device, in accordance with example embodiments.

FIG. 4 shows a block diagram of a second measurement system 40 including a testing device 1, in accordance with example embodiments of the present invention. With reference to FIG. 4, reference point A is chosen to be located between the first and the second circuit component within the testing device 1, and reference point B is chosen in a way that L" circuit components on a signal path between reference point A and the processing unit 4 within the device under test 2 are not part of the noise $$P_{N_L^{(i)}}^{tot}$$

or equivalently signal to noise ratio $SNR_L^{(i)}$) measurements.

Figure 5:
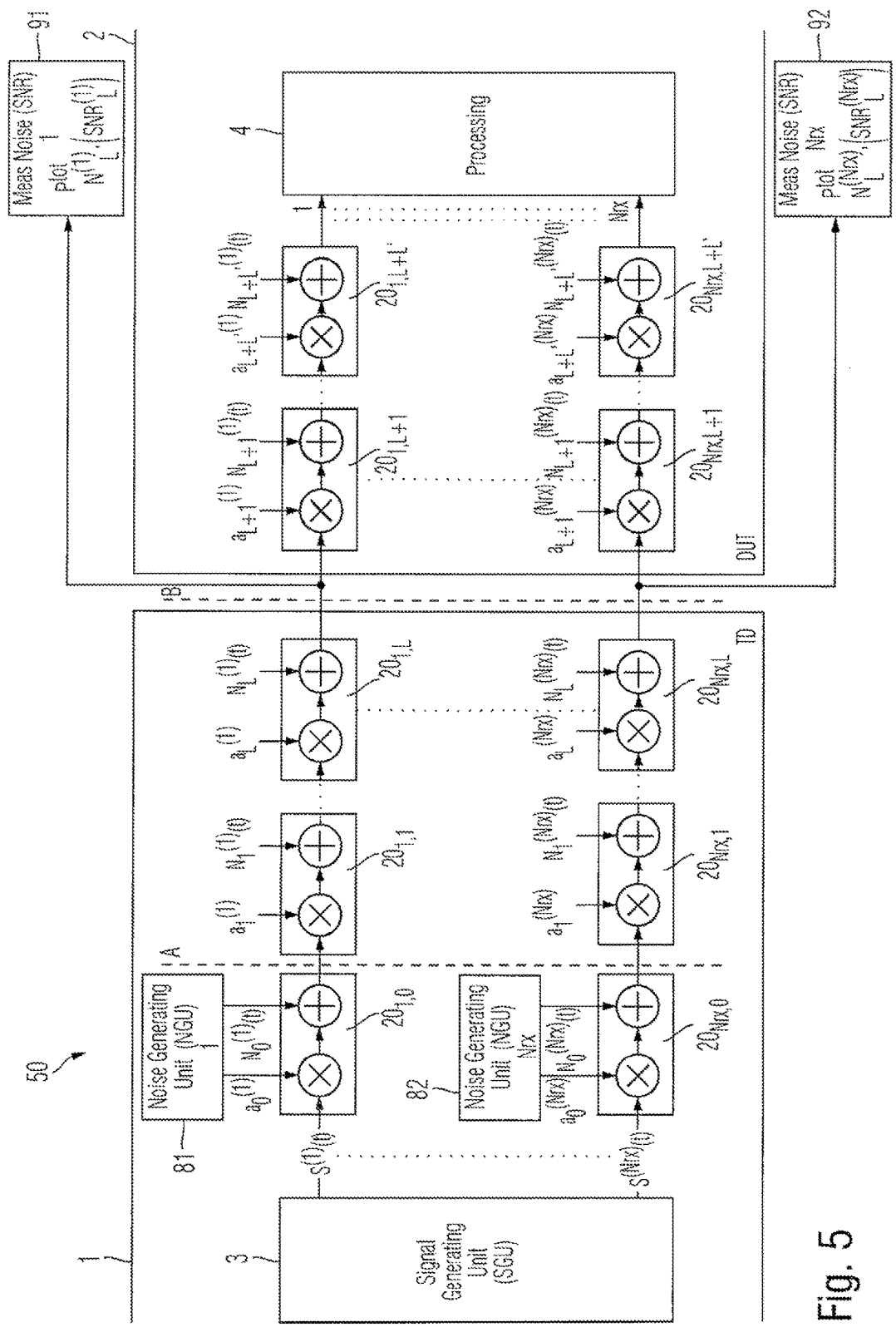
FIG. 5 shows a block diagram of a third measurement system including a testing device, in accordance with example embodiments; and in accordance with example embodiments.

FIG. 5 shows a block diagram of a third measurement system 50 including a testing device 1, in accordance with example embodiments of the present invention. With reference to FIG. 5, the reference point B is chosen outside the testing device and the device under test, whereas, as with the previous example measurement setups according to FIG. 1 and FIG. 4, the reference point A is chosen to be located between the first and the second circuit component within the testing device 1. As is evident from FIG. 5, reference point B is chosen to be located outside both the testing device 1 and the device under test 2. Thus, L' circuit components, which are contained by the device under test 2, on a signal path between reference point A and the processing unit 4 within the device under test 2 are not part of the noise $$P_{N_L^{(i)}}^{tot}$$

or equivalently signal to noise ratio $SNR_L^{(i)}$) measurements. In this case, it is possible to achieve a wanted measured total noise power $$P_{N_{User}^{(i)}}^{tot} \left(\text{i.e. } P_{N_L^{(i)}}^{tot} = P_{N_{User}^{(i)}}^{tot}\right)$$

or equivalently a wanted measured signal-to-noise ratio $SNR_{User}^{(i)}$ (i.e. $SNR_L^{(i)} = SNR_{User}^{(i)}$) at either the output (port or connector) of the testing device 1 or at the input (port connector) of the device under test 2.

Additionally, an external measurement device has to be applied at either the output (port or connector) of the testing device 1 or at the end of the cable connecting the testing device 1 and the device under test 2, respectively.

Figure 6:
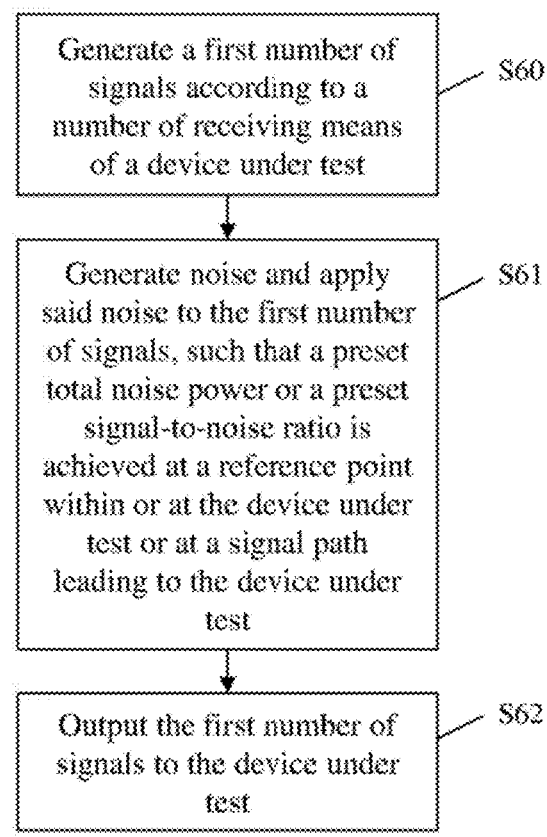
FIG. 6 shows a flow chart of a testing method, in accordance with example embodiments.

FIG. 6 shows a flow chart of a testing method, in accordance with example embodiments of the present invention. In a first step S60, a first number of signals according to a number of receiving means of a device under test is generated. In a second step S61, noise is generated and applied to the first number of signals, such that a preset total noise power or a preset signal-to-noise ratio is achieved at a reference point within or at the device under test or at a signal path leading to the device under test. Then, in a third step S62, the first number of signals is output to the device under test.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:
1. A testing device comprising:
   a signal generating unit configured to generate a first number of signals based on a number of receiving components of a device under test;
   at least one noise generating unit, each configured to generate noise and to apply the noise to the first number of signals, such that one of a preset total noise power and a preset signal-to-noise ratio is achieved at a reference point associated with the device under test; and
   a reference measurement device configured to measure, at the reference point, one of the total noise power, the signal-to-noise ratio and the power of the other noise sources; and wherein the testing device is configured to output a second number of signals to the device under test, wherein the second number of signals corresponds to either the first number of signals or the first number of signals with the applied noise, wherein the preset total noise at the reference point is equal to a sum of other noise sources along a corresponding signal path and the noise generated and applied by the at least one noise generating unit, and wherein the measured one of the total noise power, the signal-to-noise ratio and the power of the other noise sources are fed back to the testing device.

2. The testing device according to claim 1, wherein the reference point associated with the device under test is one of within the device under test, at the device under test and in a signal path between the testing device and the device under test.

3. The testing device according to claim 1, wherein the testing device further comprises a fading unit configured to emulate a transmission channel and to process the first number of signals in a manner whereby the first number of signals is faded in consideration of the emulated transmission channel.

4. The testing device according to claim 3, wherein the emulated transmission channel is one of time-invariant and time-variant.

5. A testing device comprising:
a signal generating unit configured to generate a first number of signals based on a number of receiving components of a device under test; and
at least one noise generating unit, each configured to generate noise and to apply the noise to the first number of signals, such that one of a preset total noise power and a preset signal-to-noise ratio is achieved at a reference point associated with the device under test; and
wherein the testing device is configured to output a second number of signals to the device under test, wherein the second number of signals corresponds to either the first number of signals or the first number of signals with the applied noise,
wherein the preset total noise at the reference point is equal to a sum of other noise sources along a corresponding signal path and the noise applied by the at least one noise generating unit,
wherein the device under test is configured to measure, at the reference point, one of the total noise power, the signal-to-noise ratio and the power of the other noise sources, and
wherein the measured total noise power, signal-to-noise ratio or power of the other noise sources are fed back to the testing device.

6. The testing device according to claim 5, wherein the testing device further comprises a fading unit configured to emulate a transmission channel and to process the first number of signals in a manner whereby the first number of signals is faded in consideration of the emulated transmission channel.

7. The testing device according to claim 6, wherein the emulated transmission channel is one of time-invariant and time-variant.

8. The testing device according to claim 5, wherein the reference point associated with the device under test is one of within the device under test, at the device under test and in a signal path between the testing device and the device under test.

9. A testing method comprising:
generating a first number of signals based on a number of receiving components of a device under test;
generating noise and applying the noise to the first number of signals, such that one of a preset total noise power and a preset signal-to-noise ratio is achieved at a reference point associated with the device under test;
outputting a second number of signals to the device under test, wherein the second number of signals corresponds to either the first number of signals or the first number of signals with the applied noise;
measuring, at the reference point, one of the total noise power, the signal-to-noise ratio and the power of the other noise sources; and
feeding the measured total noise power, signal-to-noise ratio or power of the other noise sources back to the testing device; and
wherein the preset total noise at the reference point is equal to a sum of other noise sources along a corresponding signal path and the noise generated and applied to the first number of signals.

10. The testing method according to claim 9, further comprising:
emulating a transmission channel and processing the first number of signals in a manner whereby the first number of signals is faded in consideration of the emulated transmission channel.

11. The testing method according to claim 10, wherein the emulated transmission channel is one of time-invariant and time-variant.

* * * * *